United States Patent
Nagel et al.

(10) Patent No.: US 9,608,680 B2
(45) Date of Patent: Mar. 28, 2017

(54) MESSAGING DEVICES AND METHODS

(71) Applicant: American Messaging Services, LLC, Lewisville, TX (US)

(72) Inventors: John F. Nagel, Southlake, TX (US); J. Roy Pottle, Wellesley, MA (US); Peter C. Barnett, Mason, OH (US); David Andersen, Dillon, CO (US); Jamie Gordon Nlchol, Arlington, MA (US); Sangsoo Kim, Seoul (KR)

(73) Assignee: American Messaging Services, LLC, Lewisville, TX (US)

( * ) Notice: Subject to any disclaimer, the term of this patent is extended or adjusted under 35 U.S.C. 154(b) by 62 days.

(21) Appl. No.: 14/462,740

(22) Filed: Aug. 19, 2014

(65) Prior Publication Data

US 2014/0357209 A1    Dec. 4, 2014

Related U.S. Application Data

(63) Continuation of application No. 13/758,643, filed on Feb. 4, 2013, now Pat. No. 8,841,989.

(51) Int. Cl.
  *H04Q 1/30* (2006.01)
  *H04B 1/10* (2006.01)
  *H04W 24/10* (2009.01)
  *H04W 88/02* (2009.01)

(52) U.S. Cl.
  CPC .......... *H04B 1/1027* (2013.01); *H04W 24/10* (2013.01); *H04B 2001/1072* (2013.01); *H04W 88/022* (2013.01)

(58) Field of Classification Search
  CPC ......... H04B 1/1027; H04B 2001/1072; H04W 24/10; H04W 88/022

USPC ........................................................ 340/7.43
See application file for complete search history.

(56) References Cited

U.S. PATENT DOCUMENTS

| | | | |
|---|---|---|---|
| 5,438,327 A | 8/1995 | Toriya et al. | |
| 5,475,863 A | 12/1995 | Simpson et al. | |
| 5,546,077 A | 8/1996 | Lipp et al. | |
| 5,646,303 A * | 7/1997 | Sun ...................... | A61K 31/40 |
| | | | 548/567 |
| 5,649,303 A * | 7/1997 | Hess ..................... | H04W 16/14 |
| | | | 370/337 |
| 5,745,844 A | 4/1998 | Kromer et al. | |
| 5,929,773 A | 7/1999 | Nelms et al. | |
| 6,097,933 A | 8/2000 | Bennett et al. | |
| 6,112,055 A | 8/2000 | Bennett et al. | |
| 6,215,980 B1 | 4/2001 | Kim | |
| 6,965,769 B2 | 11/2005 | Bims et al. | |
| 7,367,227 B2 | 5/2008 | Stewart et al. | |
| 2002/0167396 A1 | 11/2002 | Chang | |

(Continued)

OTHER PUBLICATIONS

International Search Report and Written Opinion of the International Searching Authority, International Application No. PCT/US2014/014542, International filing date Feb. 4, 2014, Date of opinion Apr. 7, 2015, 10 pages.

*Primary Examiner* — Naomi Small
(74) *Attorney, Agent, or Firm* — Ulmer & Berne LLP

(57) ABSTRACT

An electronic messaging device includes a receiver configured to receive a message at one of a first operational frequency and second operational frequency. The messaging device can operate using a time synchronous protocol and can receive commands through over-the-internet-programming (OTIP) and over-the-air-programming (OTAP).

17 Claims, 15 Drawing Sheets

(56) References Cited

U.S. PATENT DOCUMENTS

| | | | |
|---|---|---|---|
| 2005/0203912 A1* | 9/2005 | Beach | H04R 1/1091 709/221 |
| 2006/0082441 A1 | 4/2006 | Papamihalis | |
| 2007/0255348 A1* | 11/2007 | Holtzclaw | A61B 5/0002 607/60 |
| 2008/0266083 A1* | 10/2008 | Midholt | G06F 3/017 340/540 |
| 2009/0212939 A1* | 8/2009 | Richmond | G08C 17/02 340/539.11 |
| 2009/0298460 A1 | 12/2009 | Ruda et al. | |
| 2010/0304738 A1* | 12/2010 | Lim | H04W 36/30 455/426.1 |
| 2011/0050451 A1* | 3/2011 | Mierta | G08C 17/02 340/12.22 |
| 2011/0255516 A1* | 10/2011 | Pawar | H04W 36/30 370/332 |

* cited by examiner

MESSAGING DEVICES AND METHODS

CROSS-REFERENCE TO RELATED APPLICATIONS

This application is a continuation of prior application U.S. patent application Ser. No. 13/758,643, entitled "MESSAGING DEVICES AND METHODS," filed Feb. 4, 2013, the disclosures of which is incorporated herein by reference in its entirety.

TECHNICAL FIELD

The present application generally relates to the field of wireless electronic communications. More specifically, the present application relates to messaging device systems and methods.

BACKGROUND

Paging systems are a reliable and generally inexpensive communication tool. Paging systems operate on a variety of communication protocols, including the FLEX® protocol by Motorola Inc., which is a four-level protocol that presently functions at bit rates of up to sixty-four hundred bits per second. Generally, the FLEX® protocol reduces the number of errors received in transmissions and reduces the possibility that a page will be missed or garbled to the point where it is unreadable or unusable. Further, it allows for a relatively large number of end users to be supported.

The modulation range of FLEX® is plus and minus forty-eight hundred kilohertz of deviation. FLEX®'s four levels are defined as −4,800 hertz, −1,600 hertz, +1,600 hertz, and +4,800 hertz, with reference to the operating frequency. Each level represents two bits in a given transmission. They represent '00', '01', '11', and '10' respectively.

Additionally, FLEX® allows for the adjustment of bit rate based upon the channel loading, operating at 1,600, 3,200, or 6,400 bits per second. FLEX® can switch between four level and two level operation as needed, which can improve paging quality during times of low or reduced activity and increase channel capacity during times of high traffic.

DETAILED DESCRIPTION

Figure 1:
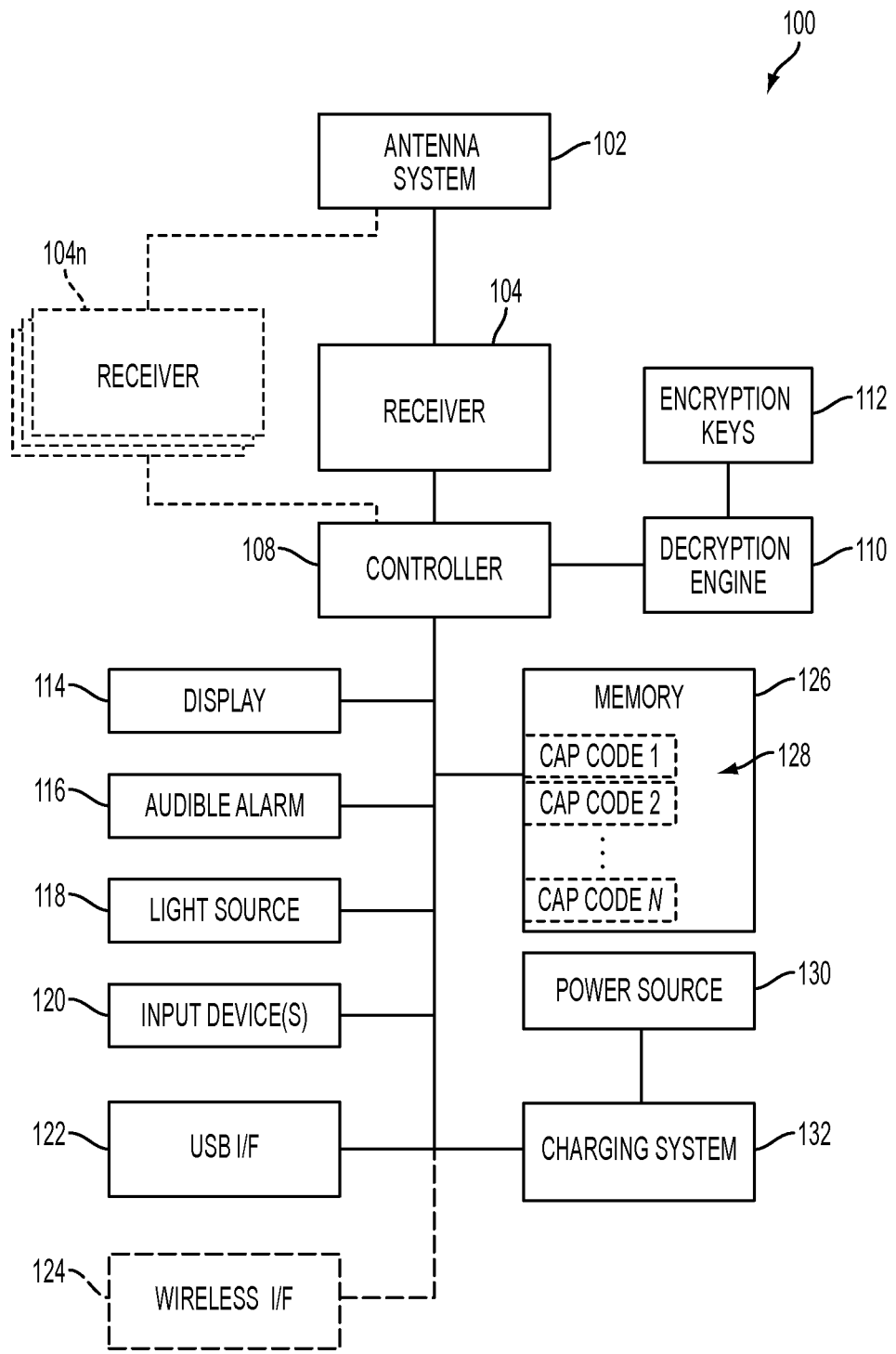
FIG. 1 is a block diagram of a messaging device in accordance with one non-limiting embodiment.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Throughout this disclosure, references to components or modules generally refer to items that logically can be grouped together to perform a function or group of related functions. Components and modules can be implemented in software, hardware, or a combination of software and hardware. The term software is used expansively to include not only executable code, but also data structures, data stores and computing instructions in any electronic format, firmware, and embedded software. It should be noted that although examples discussed below might describe specific features or functions as part of a specific component or module, those features or functions may be implemented as part of a different component or module.

The examples discussed below are examples only and are provided to assist in the explanation of the systems and methods described. None of the features or components shown in the drawings or discussed below should be taken as mandatory for any specific implementation of any of these systems or methods unless specifically designated as mandatory. For ease of reading and clarity, certain components, modules, or methods, may be described solely in connection with a specific figure. Any failure to specifically describe a combination or subcombination of components should not be understood as an indication that any combination or subcombination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

The presently disclosed system and methods generally relate to messaging devices, such as pagers, and associated systems that can be used in a variety of operational environments, including the medical industry. For example, the systems and methods as disclosed herein can be used in connection with messaging devices deployed in a geographically dispersed area, such as a college campus, airport, or seaport, that allow an authorized party to issue almost instantaneous updates on critical events, such as a terrorist strike or a natural disaster, though messages sent via a communication network. Thus, while many of the embodiments described herein are in the context of the medical industry, it is to be appreciated that such disclosure is merely illustrative and that the systems and methods disclosed herein are applicable across a wide range of operational environments.

The messaging devices described herein operate using a time synchronized protocol, such as the FLEX® paging protocol, or other suitable time synchronized protocol. Generally, with a time synchronized protocol the receiving device uses transmitted data to maintain synchronization. The time synchronized protocol provides data at precise time intervals allowing the receiver to monitor and adjust timing as needed. By comparison, with asynchronous protocols, a preamble is transmitted for a length of time to guarantee that all messaging devices with that asynchronous protocol can "wake-up" or lock to the signal. The added preamble waste air time and can force messaging devices to keep their receiver circuits energized until a synchronization word is detected. Thus an asynchronous protocol is generally less efficient than a time synchronized protocol at the same data rate, since the time spent transmitting a preamble in an asynchronous protocol can be time used to transmit other types of data in a synchronous protocol.

Messaging devices described herein can be one-way devices or two-way devices. Two-way devices can utilize a return channel to provide information to the network, such as the location of the messaging device, message state, or an alphanumeric message, for example. Such devices can use any suitable protocol for these transmissions, such as the ReFLEX® paging protocol (Motorola, Inc.), a WiFi-based protocol, or a Bluetooth-based protocol. In some embodiments, as described in more detail below, the messaging device may be in wireless communication with a smart phone, or other portable communications device, of an end user via a suitable data communications link.

The systems and methods described herein generally provide numerous features that seek to improve the experience of the end user of a messaging device and/or a network administrator, including, for example, dual-frequency capability, over-the-internet-programming (OTIP), a Universal Serial Bus ("USB") interface, battery savings techniques, and/or message encryption.

With regard to dual-frequency capability, messaging devices in accordance with the systems and methods described herein can operate on multiple frequencies utilizing any suitable protocol, such as the FLEX®, ReFLEX® protocol, or other suitable time synchronous protocol. In typical hospital operational environments, for example, in-house or campus-wide paging networks operate on a frequency that is separate from the wide-area frequencies provided by narrowband paging carriers. By utilizing dual-frequency capability, the messaging devices described herein generally combine the speed and reliability of an in-house system with the wide area footprint of a commercial paging carrier, since the messaging device is operating on both frequencies simultaneously. Some embodiments of the messaging devices can operate on more than two frequencies.

With regard to OTIP, messaging devices in accordance with the systems and methods described herein seek to improve the efficiency for network administrators and end users by allowing certain pager features to be programmed or updated over the internet by way of a network connection. Therefore, the necessity for an end user to bring or send their messaging device to a centralized location (or to a vendor) if certain pager programming is required can be reduced or even eliminated. In some embodiments, as described in more detail below, an end user can couple a messaging device to a computer to accept programming commands. Via a software application executed on the computer, for example, network administrators can send programming commands through the Internet to the end user's messaging device. Additionally, when the messaging device is coupled to the computer, the messaging device can upload messages from the messaging device to the computer for storage. In some embodiments, when the messaging device is coupled to a computer, the last fifty messages (or other desired number of messages) that were received by the messaging device will upload into a software application executed on the computer and can be subsequently routed to the network administrator for viewing and storage purposes. In order to preserve messaging for auditing or for other purposes, in various embodiments, messages stored locally on the messaging device can be deleted from the display screen by the end user but cannot be deleted from local storage on the messaging device until they are uploaded for storage.

The messaging device can interface with the computer using any suitable type of wired or wireless interface. In one embodiments, a Universal Serial Bus (USB) interface is utilized which allows an electrical charge to be delivered to a rechargeable battery, and a connection for local Paging Programming Software ("PPS") on the computer and access to OTIP. As is to be appreciated, a variety of different communication protocols can be used without departing from the scope of the present disclosure, such Bluetooth® protocols, for example.

Messaging devices in accordance with various embodiments of the present disclosure can provide message encryption, as is emerging as a requirement within certain operational environments, such as hospital environments, for example. Thus, sensitive patient information, or other private information, can be sent over paging networks described herein in encrypted formats. In some embodiments, the Secure Paging Layer (SPL) protocol from Critical Response Systems™ using AES-128 encryption can be used. Additional spoilers may be added for additional security. Details regarding the SPL protocol can be found in Secure Paging Layer Protocol Specification, Version 0.9, February 2012, which is incorporated herein by reference. Updates to the encryption keys associated with the encryption protocol can be received via Over-the-Air-Programming (OTAP) or via OTIP, as described in more detail below. In some embodiments, Critical Security Parameters (CSP) such as passcodes and encryption keys can have counters associated with them counting the number of times used, how much time has elapsed since updates and how often a CSP is rejected. CSPs can be are stored in memory on the messaging device in a scrambled or interleave fashion. In some embodiments, the messaging device can receive a destruct command, either via OTAP or OTIP that will clear all messages from the device and render the device useless.

In some embodiments, a messaging device can include a rechargeable power supply that is chargeable via a micro-USB port. Other embodiments, however, utilize disposable batteries or other type of power source. In any event, various power consumption techniques described herein seek to increase the life of the message device, thereby seeking to reduce the need to charge the messaging device via an external power source or the need to replace the disposable batteries.

FIG. 1 is a block diagram of a messaging device 100 in accordance with one non-limiting embodiment. The messaging device 100 can include an antenna system 102 coupled to a receiver 104. The antenna system 102 can include a Low Noise Amplifier (LNA) to amplify received signals. The antenna system 102 can also permit multi-frequency operation, as described in more detail below. Some embodiments can have multiple receivers 104n which can be used to scan for multiple operational frequencies. A controller 108, such as a small ARM™ embedded controller, for example, can be programmed to manage the user interface and other functionality of the messaging device 100. In some embodiments, a decryption engine 110 can utilize encryption keys 112 for the decryption of various messaging received by the messaging device 100. Updates to encryption keys 112 can be received via OTAP and/or OTIP. A display 114 can be used to display text or graphical messages. In one embodiment, a liquid crystal display may be used. As is to be readily appreciated, other types of suitable displays, such as touch-screen displays, can be used. An audible alarm 116 can be used to audibly draw attention to receipt of a message or other notifications. A light source 118 can be used to visually draw attention to receipt of a message or other notifications. In some embodiments, the light source comprises one or more light emitting diodes (LEDs), or other type of light source, capable of selectively providing a visual indication. An input device 120 can allow for a user to interact with the messaging device 100 to scroll through messages, select messages, or delete messages, for example. The input device 120 can include navigational arrows, an "enter" key, and so forth. An optional backlight (not depicted) may allow use in low-light conditions.

The messaging device 100 can also include one or more interfaces which support data exchange between the messaging device 100 and a computing device, which can be any type computer device suitable for communication over the network, such as a tablet computer, a laptop computer, netbook computer, desktop computer, and so forth. An example interface is illustrated as a Universal Serial Bus (USB) electrical interface 122. The USB electrical interface 122 can include, for example, a standard-USB or a micro-USB port. Alternatively, or additionally, the messaging device 100 can include a wireless interface 124 to allow for wireless transfer of data between the messaging device 100 and another computer device. The wireless interface 124 can include a Bluetooth® module, a ZigBee® module, or a Wi-Fi™ module, for example.

Still referring to FIG. 1, a memory 126 can include volatile or non-volatile memory. Volatile memory units can include random access memory (RAM), for example. Non-volatile memory units can include read only memory (ROM), for example, as well as mechanical non-volatile memory systems, such as, for example, a hard disk drive, etc. The RAM and/or ROM memory units can be implemented as discrete memory ICs, for example. The memory 126 can include program memory, message storage, or both. One or more device identifiers 128 can be used by the controller 108 to select signals intended for itself. The device identifiers 128 can be Channel Access Protocol (CAP) codes, as illustrated. The device identifiers 128 can include a unique identifier so that the messaging device 100 can be sent an individually-targeted message.

A power source 130 can be non-removably mounted in the messaging device 100. The power source 130 can be, for example, a 1100 milliamps-per-hour ("mAh") Lithium Ion rechargeable battery or a 500 mAh Lithium Ion rechargeable battery. The power source 130 can be in communication with a charging system 132 that, for example, is configured to receive energy from the USB electrical interface 122. In one embodiment, the charging system 132 is an inductive charger. It is noted that some embodiments of the messaging device 100 can utilize other power sources, such as disposable batteries. The charging system 132 can utilize a hardware or software "fuel gauge" to track the power source's relative state-of-charge (SOC). In some embodiments, a visual indication of the SOC is graphically provided on the display 114. The visual indication can be a percentage of battery life remaining and/or a dynamic image of a battery that changes based on charge, for example. An audio indictor can also be used, such as a repeating chirp, to indicate a low battery level.

Figure 2:
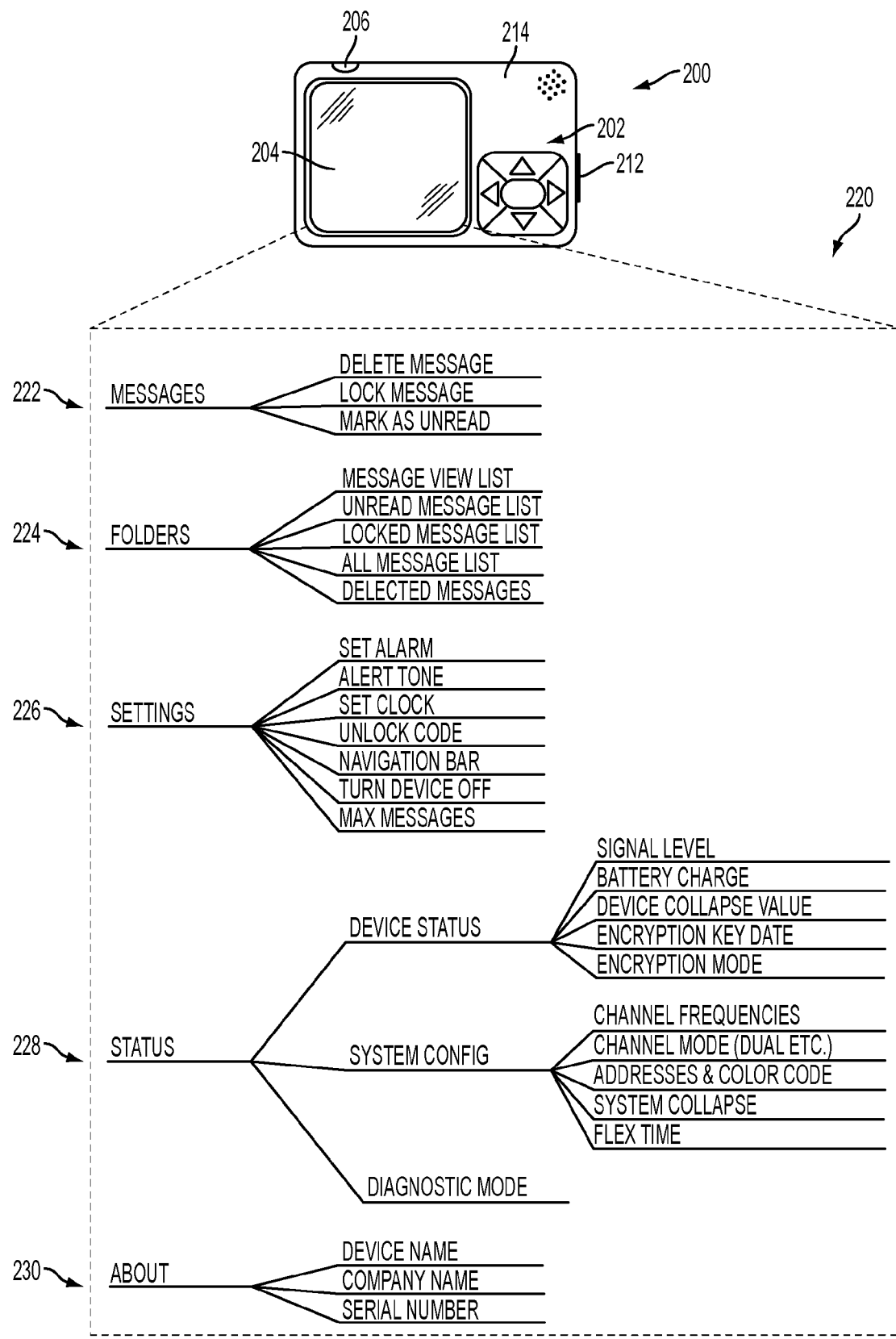
FIG. 2 depicts an example messaging device along with a representation of an example graphical user interface menu tree.

FIG. 2 depicts an example messaging device 200 along with a representation of an example graphical user interface menu tree 220. The messaging device 200 comprises a body 214 which houses various components, such as an input device 202, a display 204, and a light source 206. The messaging device 200 can also include an audible indicator or vibratory indicator (not shown). The sound level produced by the audible indicator can be selected based on operational environments. In some implementations, the sound level generated by the audible indicator may reach at least 85 dB at a range of 12 inches from the messaging device 200. In other implementations, the sound level generated by the audible indicator may reach at least 95 dB at a range of 12 inches from the messaging device 200. In any event, a user of the messaging device 200 can select from a variety of different alert tones, and in some embodiments, assign particular alert tones to particular CAP codes or other types of addresses programmed in the device. A port 212, such as a data/charging port, can be positioned in a suitable location on the messaging device 200 to allow the messaging device 200 to be selectively coupled to another computing device. The data/charging port 212 can be a micro-USB port, for example. The messaging device 200 can have any suitable configuration or form factor. In one embodiment, the messaging device 200 is a key fob or other easily carried accessory. In another embodiment, the messaging device 200 is permanently attached to, or otherwise coupled with, a university-issued room key or access card (not depicted), so that a student will necessarily have the device with him or her at all times.

The graphical user interface menu tree 220 can be arranged in a nested menu format, as shown, or any other suitable arrangement. While FIG. 2 depicts one example arrangement, such arrangement is merely for illustrative purposes as a wide variety of other arrangements can be used without departing from the scope of the present disclosure. The top level menu can include a variety of options, such as message 222, folders 224, settings 226, status 228 and about 230, which can be navigated using the input device 202. Selecting, or accessing, one of the options can provide a user with additional choices. As described in more detail below, various settings and parameters of the messaging device can be updated or changed using OTIP.

Receiving an input to select messages 222, for example, takes the user to a received message landing screen. Arrow keys of the input device 202 can scroll up and down through message lists. The right arrow button can, for example, take the user to a screen that views the related message. Additional message options can include a delete message option. When the message is deleted it is removed from the message display list using this option, however, it may still remain stored local to the messaging device 200 (such as within memory 126 shown in FIG. 1) for later retrieval via the USB interface, provided that the max number of messages has not been exceeded. Other message options can include locking a message and marking a message as unread, as illustrated.

Receiving an input to select folders 224 can take the user to a list of all folders on the messaging device 200. In some embodiments, the messaging device 200 can locally store a relatively large number of messages. For example, some embodiments can be capable of storing in excess of 50 messages. Some other embodiments can be capable of storing in excess of 100 messages. Other embodiments can be capable of storing 200 or more messages. As the number of stored messages increases, there is a need to efficiently navigate, control and access the stored messages while using the input device 202 and the display 204. The messaging of messaging device 200 shown in FIG. 2 utilizes a collection of message lists, each list of which is viewable view the display 204. In the illustrated embodiment, the messaging device 200 includes a "message view list," an "unread message list," a "locked message list," an "all message list," and a "deleted messages list." Messages stored in the memory (such as memory 126, FIG. 1) of the messaging device 200 will appear in one or more of these lists.

Exemplary guidelines for populating the lists will now be described. As is to be appreciated, the particular guidelines may vary based on implementation. The "Message view list" is a list of the last X number of received messages, where X is settable (e.g., 10, 25, etc.), except deleted messages. "Unread message list" is a list of all unread messages from the total list of stored messages. "Locked message list" is a list of all of the locked messages from the total list of stored messages. In some embodiments, a maximum number of locked messages may be set. Locked messages are not automatically deleted. "All Message List" is a list at all messages stored in the device, including deleted messages. Deleted messages are shown in "All Message List," but are not shown in the "Message View List." By navigating through the various lists, the user operating the messaging device 200 can access and control the relatively large number of messages that can be stored locally on the device.

It is noted that the folders 224 can be defined or structured in any suitable fashion. For example, some embodiments of the messaging device 200 can arrange messages by CAP code Name, such as "Office," "Code Blue," and "Sports."

The messaging device 200 can have multiple address parameters called CAP codes. In some embodiments, each CAP code can be designated of one of three types: Personal, Group or Maildrop. The personal CAP code is used for a main address. These types of CAP codes are for messages directed at only messaging device 200. A group CAP code can be a common CAP code (sometimes referred to as a "burned in CAP code" or a "hardwired CAP code) that are programmed in to multiple messaging devices. Common CAP codes allow for only one message to be sent out and have multiple messaging devices receive the same message at generally the same time. This is typically referred to as "One-to-Many" addressing. Maildrop CAP codes can be used for Information Services (IS). These CAP codes can receive daily, weekly type information feeds where history is not required. For each of these types of CAP codes a number of "Max Messages" can be set. As is to be readily appreciated, other messages devices in accordance with the systems and methods described herein can use different or alternative addressing techniques or protocols besides CAP codes, such as addressing based on an electronic serial number, for example. As such, CAP codes, as used herein, are merely one exemplary addressing technique.

Receiving an input to select settings 226 can allow the user to set or view various control parameters on the messaging device 202, examples of which are shown in FIG. 2. Receiving an input to select status 228 allows a user to view various operational parameters, as well as modify various operational parameters. In particular, the Channel Frequencies parameter of the System Config menu frequency can list the two frequencies that are set for dual-frequency operation. The Channel Mode parameter can list, for example, the current mode of operation along with the current frequency that the messaging device 200 is listening on. Addresses and Color Code can list the CAP Codes and their associated color code, priority and CAP code Name. The System Collapse parameter can display the last received system collapse value. The FLEX® time parameter can display the last received FLEX® time from the network. The messaging device 200 can also include other various options, such as an About option 230, which can display a message on the display 204 when activated. The message can include a settable, or programmable, portion that be updated via the OTIP or OTAP functionality, as described in more detail below.

Figure 3:
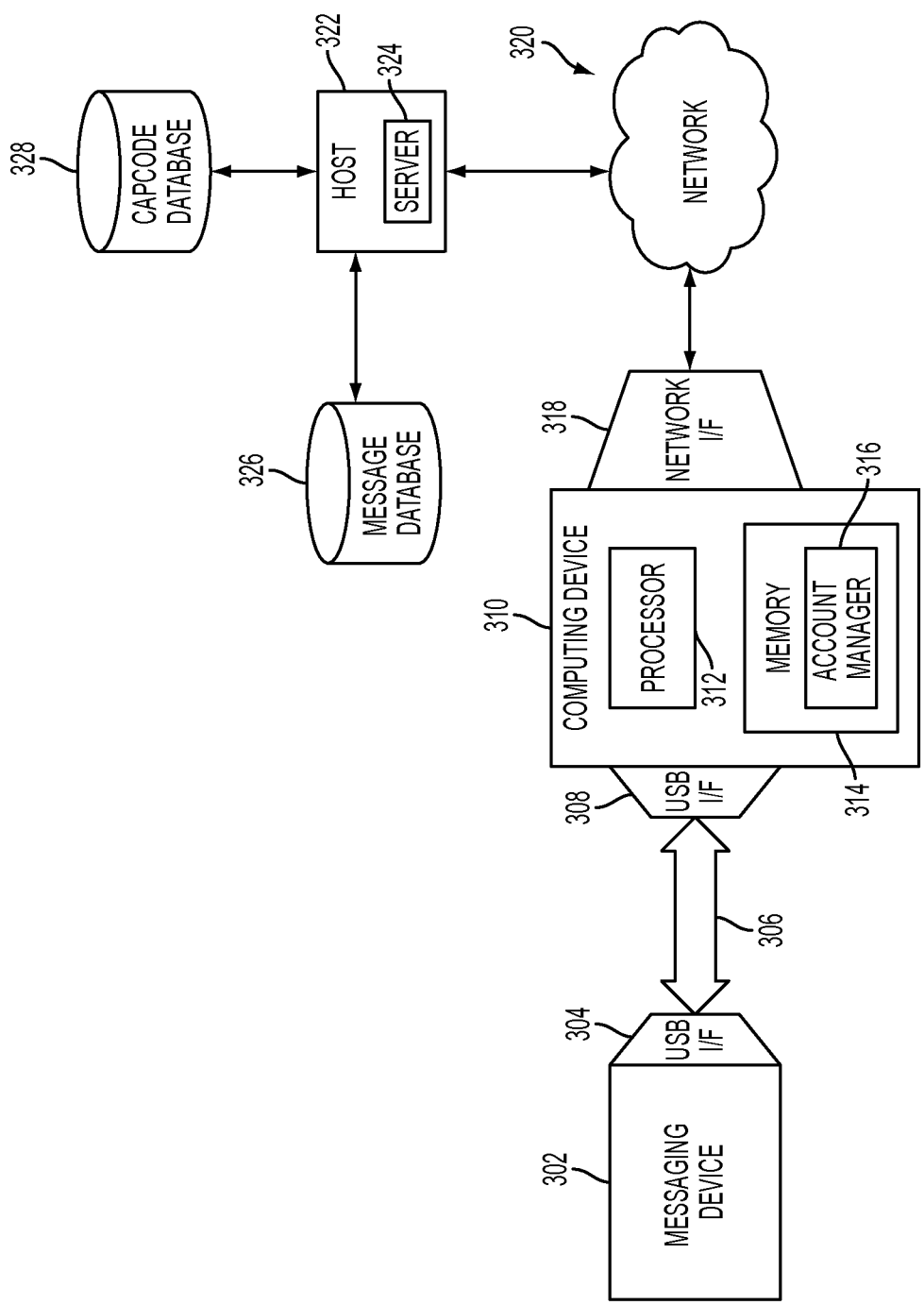
FIG. 3 depicts an example system diagram of a messaging device in communication with a host via an Over-the-Internet-Programming (OTIP) technique.

FIG. 3 depicts an example system diagram of a messaging device 302 in communication with a host 322 via an OTIP technique. The messaging device 302 is electrically coupled to a computing device 310 via a communications link 306. In the illustrated embodiment, the communications link 306 is a USB cable that is selectively placed in electrical communication with an USB interface 304 of the messaging device 302 and a USB interface 308 of the computing device 310. Other forms of communications links can be utilized, such as Bluetooth® or Near Field Communication (NFC) protocols, for example. In addition to serving as a data communication link between the messaging device 302 and the computing device 310, the communications link can also serve to deliver energy to the messaging device 302 to charge the power source (such as power supply 130 in FIG. 1).

The computing device 310 can be any suitable processor-based device or system, such as a personal computer, laptop, server, mainframe, or a collection (e.g., network) of multiple computers, for example. The computing device 310 can include one or more processors 312 and one or more computer memory units 314. For convenience, only one processor 312 and only one memory unit 314 are shown in FIG. 3. The processor 312 may execute software instructions stored on the memory unit 314 to execute an account manager application 316. The processor 312 may be implemented as an integrated circuit (IC) having one or multiple cores. The memory 314 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The computing device 310 can be in electrical communication with a host 322 via a networked connection 320, such as an Internet-based connection through a network interface 318. The host 322 can include a server 324 for facilitating the transmission of commands, instructions, or other data to be sent to the messaging device 302 via the computer device 310. Such communications can be encrypted or otherwise secured using suitable encryption protocols. A network administrator can interact with the host 322 to selectively decide which commands will be sent to particular messaging devices. Such commands can include, without limitation, changes to the parameters/settings of the messaging device (such as various settings illustrated in the interface menu tree 220 of FIG. 2), updates to firmware of the messaging device, changes to CAP codes, and/or adding additional encryption keys. A CAP code database 328 can be used to store information regarding various messaging devices associated with the host 322. With regard to the firmware of the messaging device 302, it is noted that in some embodiments the computer device 310 can upgrade the firmware using the account manager application 316.

Messages, or other information, stored local to the messaging device 302 can be uploaded to the computing device 310 and/or the host 322 once the communications link 306 is made. The host 322 can receive messages from the messaging device 302 and store them in suitable storage media, such as a message database 326. The account manager application 316, or other suitable software application, executed by the computer device 310 can facilitate the uploading or transferring of the messages.

Figure 4:
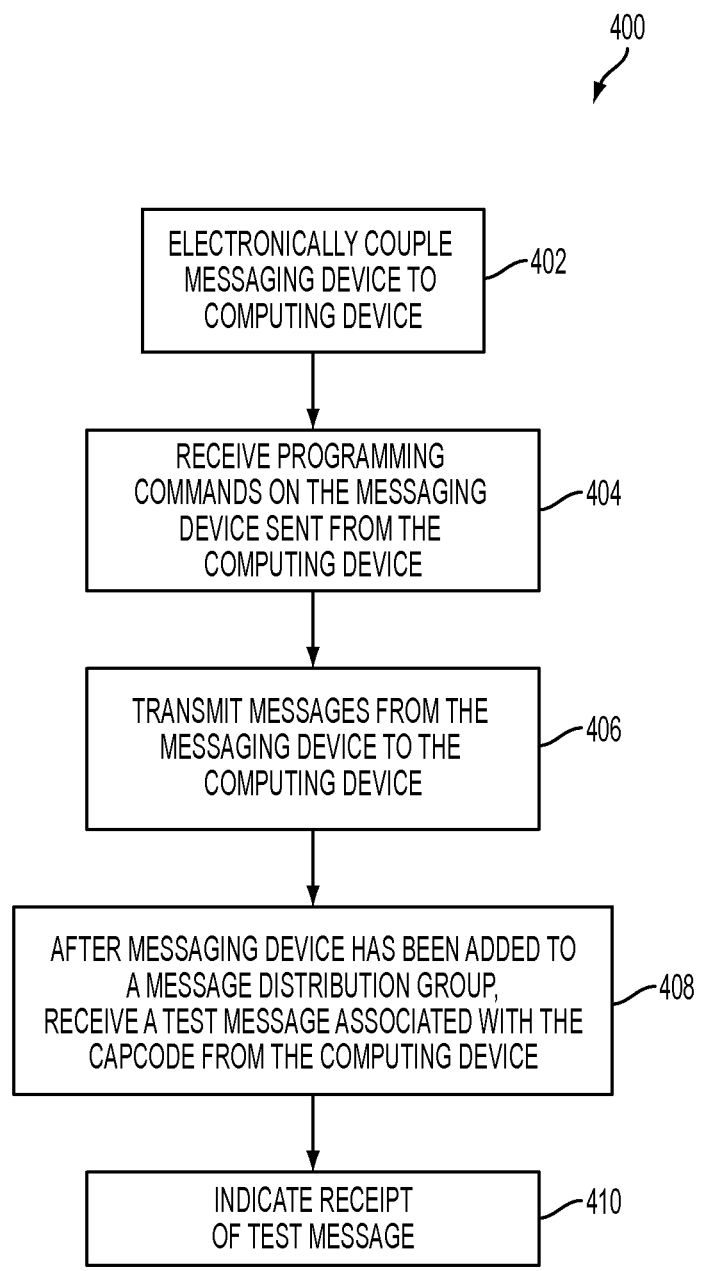
FIG. 4 depicts an example process for execution by a messaging device coupled to a computing device.

FIG. 4 depicts an example process 400 for execution by a messaging device that is coupled to a computing device. At 402, the messaging device is electronically coupled to a computing device. As described above, this electronic coupling may be a USB-based coupling, a wireless-based coupling, or any other suitable form of coupling that allows data transfer between the messaging device and the computing device. At 404, programming commands are received on the messaging device that have been sent from the computing device. These programming commands could include, for example, an update to firmware or encryption keys. At 406, messages stored locally to the messaging device can be transmitted to the computing device. At 408, after the messaging device has been added to a particular message distribution group, a test message can be received at the messaging device that is associated with that particular message distribution group. In other words, the test message is dropped into the firmware of the message device so that it can attempt to process the test message as if it was received via an over-the-air transmission. At 410, upon successful receipt of the test message, receipt is indicated. The processes at 408 and 410 beneficially allow for a message distribution group update to be confirmed without necessarily having to globally transmit a test message to all messaging devices associated with that message distribution group. Instead, using the OTIP techniques described herein, such updates can be confirmed via a test message sent only to the firmware of a messaging device coupled to a computer device. Such testing techniques generally allow for confirming that a messaging device has been successfully added to a particular message distribution group without having to inconveniently broadcast a test page to all members of the message distribution group.

Figure 5:
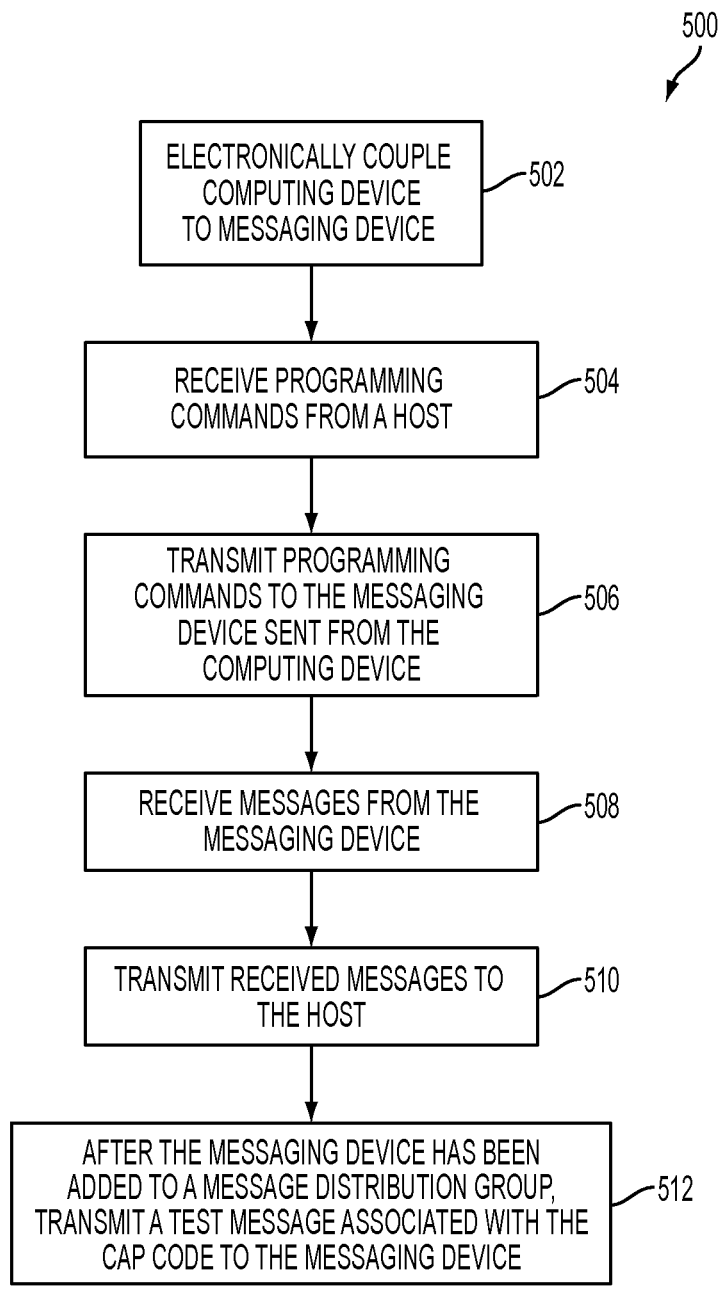
FIG. 5 depicts an example process for execution by a computing device that is coupled to a messaging device.

FIG. 5 depicts an example process 500 for a computing device that is coupled to a messaging device. At 502, the computing device is electronically coupled to a messaging device. As described above, this electronic coupling may be a USB-based coupling, a wireless-based coupling, or any other suitable form of coupling that allows data transfer between the computing device and the messaging device. The computing device can be executing a suitable application such as pager programming software (PPS) and is in communication with a host via a networked connection. At 504, programming commands are received from the host. These programming commands could include, for example, an update to firmware or encryption keys. At 506, the programming commands are sent to the messaging device. At 508, messages are received from the messaging device. The messages can be stored locally at the computing device and/or at 510, transmitted to the host. At 512, after the messaging device has been added to a particular message distribution group a test message can be sent to the messaging device that is associated with that particular message distribution group.

Various messaging devices in accordance with the systems and methods described herein utilizing a time synchronous paging protocol, such as FLEX®, have a dual frequency mode that generally allows a first frequency to be set as primary frequency and a second frequency as a secondary frequency. The device will stay on the primary frequency unless the primary frequency is determined to be lost or otherwise no longer acceptable for use. The primary frequency can be associated with a local transmission station and the secondary frequency can be association with a wide-area transmission station. As described in more detail below, various decision making processes based on settable variables and real-time data can be used by the messaging device to control the switching between the available frequencies.

Figure 6:
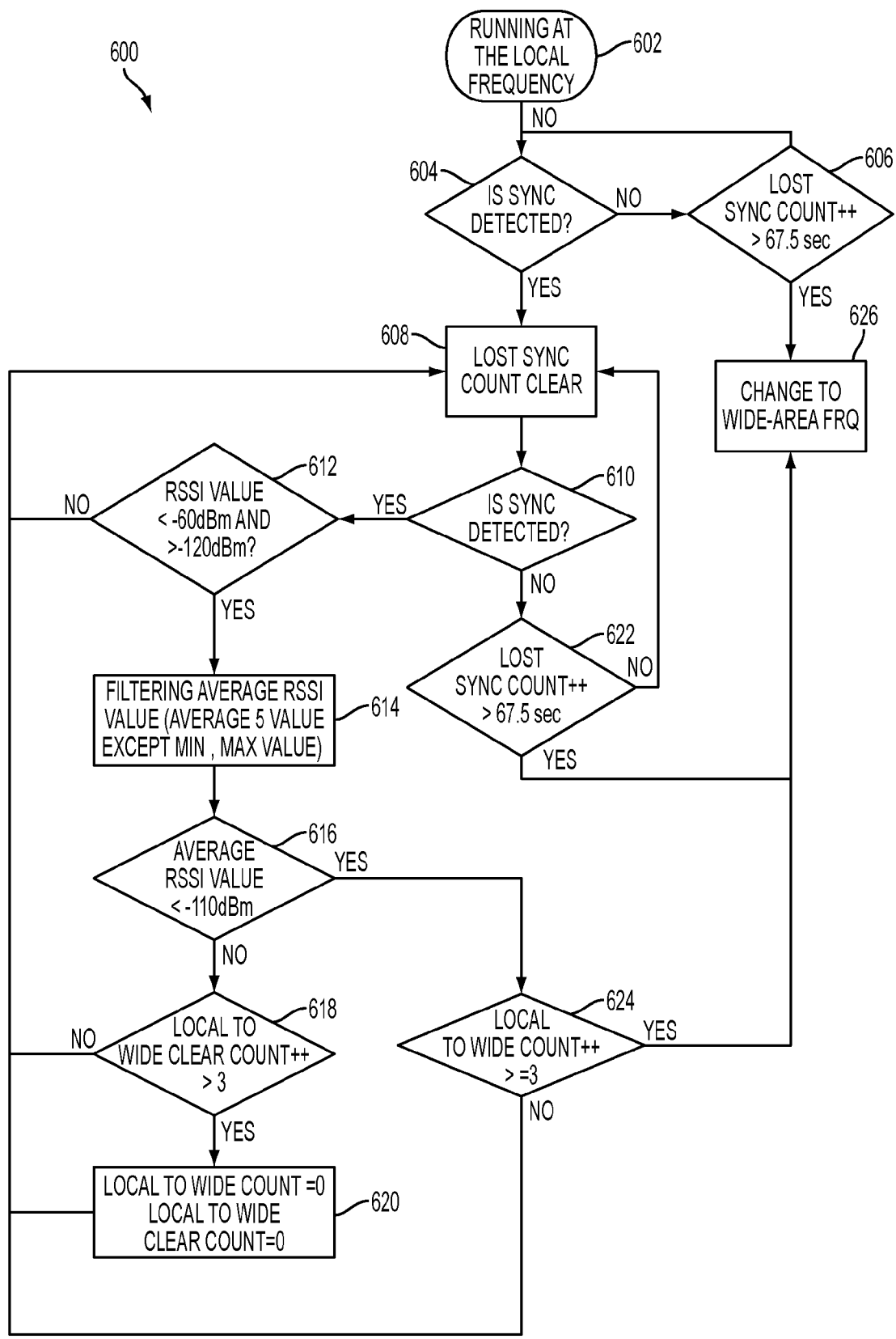
FIG. 6 depicts an example flow diagram for determining when a dual-frequency messaging device operating on a synchronous paging protocol is to change from a primary frequency to a secondary frequency.

FIG. 6 depicts an example flow diagram 600 for determining when a dual-frequency messaging device operating on a synchronous paging protocol is to change from the primary frequency (shown as "local frequency") to the secondary frequency (shown as wide-area frequency"). In some embodiments, the primary frequency and the second frequency are both within the range of 929-932 MHz. The flow diagram 600 can be executed by software residing in memory 126 (FIG. 1), for example. In general, the flow diagram 600 tracks conditions that favor either keeping the messaging device at the primary frequency (such as continually strong signal strength at the primary frequency, for example) and conditions that favor switching the operating frequency (such as a lack of synchronization signal or a continually weak signal strength at the primary frequency).

Figure 9:
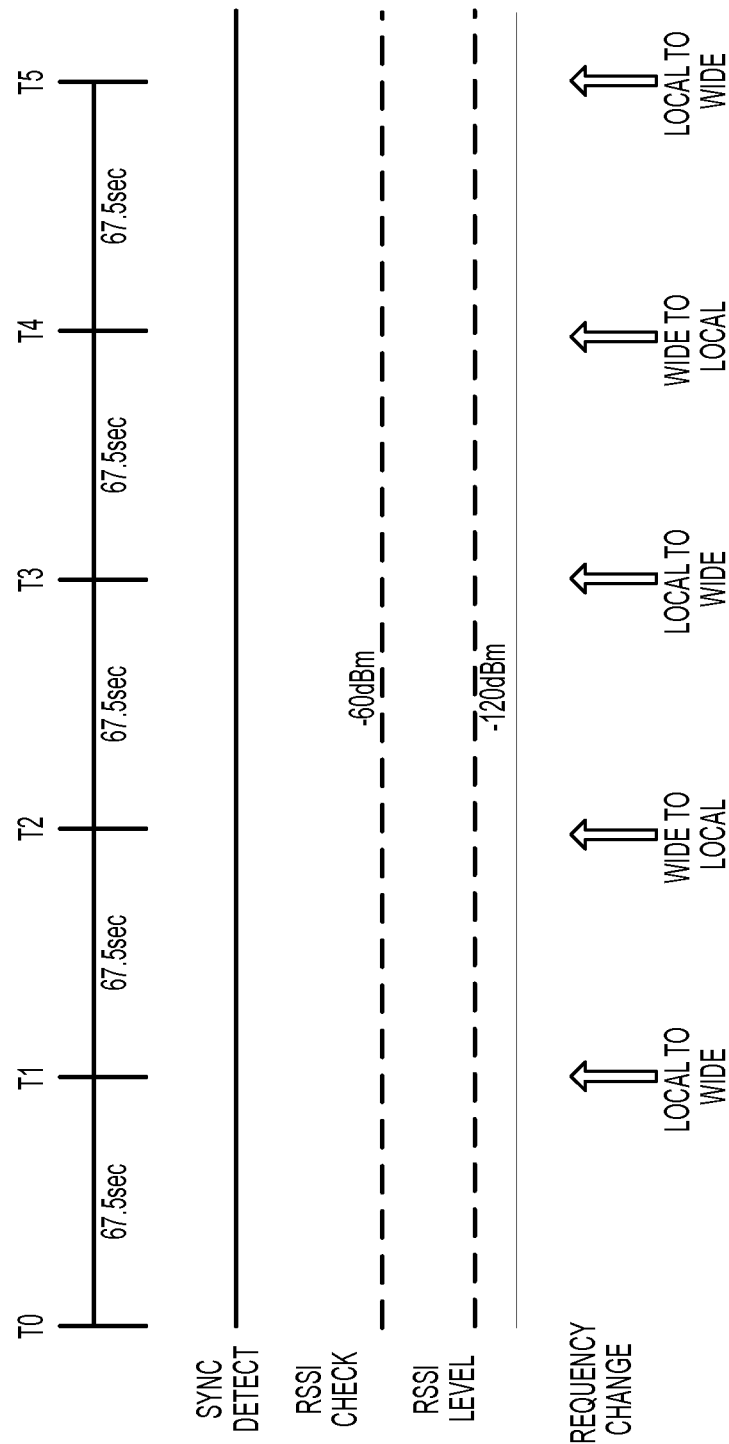
FIG. 9 depicts time-based operational frequency changes of a messaging device in accordance with one non-limiting embodiment.

At 602, a messaging device is running at the local frequency. At 604, which can occur after a reset or device power up, for example, it is determined if a synchronization signal is detected at the messaging device. If the synchronization signal is not detected, a variable is incremented at 606 (shown as Lost Sync Count). If the synchronization is not detected within a particular time period, which can be determined based on the value of the Lost Sync Count variable, the messaging device is switched to operate at the wide area frequency at 626. The time period is shown as 67.5 seconds, which is merely one example time period and coordinates to the time period associated with 36 frames in the FLEX® protocol, which are broadcasted at intervals of 1.875 seconds. FIG. 9, below, illustrates an example switching of operational frequencies based on the lack of synchronization during a defined period. Referring again to 604, if a synchronization frame is detected, a variable related to lost synchronization (e.g., "Lost Sync Count") is cleared at 608. After the synchronization frame is detected at 604, it is determined at 610 if another synchronization frame is detected at the messaging device. If the synchronization is not detected within a particular time period at 622 (shown as 67.5 seconds, which, again, is merely one example time period), the messaging device is switched to operate at the wide area frequency at 626. If a synchronization frame is detected at 610, the process proceeds to analyze the signal to determine its usefulness.

In the illustrated embodiment, at 612, the received signal strength indication (RSSI) value of the received signal is analyzed to determine if it falls within a particular target range. In one embodiment the target range is −60 dBm and −120 dBm. Other target ranges can be used. As is to be readily appreciated, other ranges of RSSI values can be used. If the RSSI value is within the range, at 614, the signal may be usable and a filtered average RSSI value is calculated. If the RSSI value is not within the target range, the process returns to 608. In the illustrated embodiment, an average of five RSSI values, excluding the minimum and maximum RSSI values, is determined. In other words, in an effort to reduce spurious or overly frequent frequency changes, the RSSI cannot be used to initiate frequency change until a certain quantity of RSSI values have been received. At 616, it is determined how the filtered average RSSI value compares to a RSSI threshold. The RSSI threshold in the illustrated embodiment is −110 dBm. If the average RSSI value is greater than the RSSI value (indicative of a relatively strong signal), the process proceeds to 618, where a variable is incremented and it is determined if the variable exceeds a threshold. In the illustrated embodiment, the variable is shown as "Local to Wide Clear" and the threshold is set at three. When the threshold is exceeded, which indicates the presence of a continually strong signal, the process proceeds to 620 where various variables, including "Local to Wide Clear" and "Local to Wide Clear Count" are set to zero. Referring again to 616, if the average RSSI value is less than the RSSI value (indicative of a relatively weak signal), the process proceeds to 624, where a variable is incremented and it is determined if the variable meets or exceeds a threshold. In the illustrated embodiment, the variable is shown as "Local to Wide" and the threshold is set at three. If the threshold is met or exceeded, which indicates the presence of a continually weak signal at the primary frequency, the messaging device is changed to operate at the secondary frequency at 626 (shown as the wide area frequency). Example operational scenarios illustrating the hysteresis effect of the processing blocks 616, 618, 620 and 624 is shown below in FIG. 11.

Figure 7:
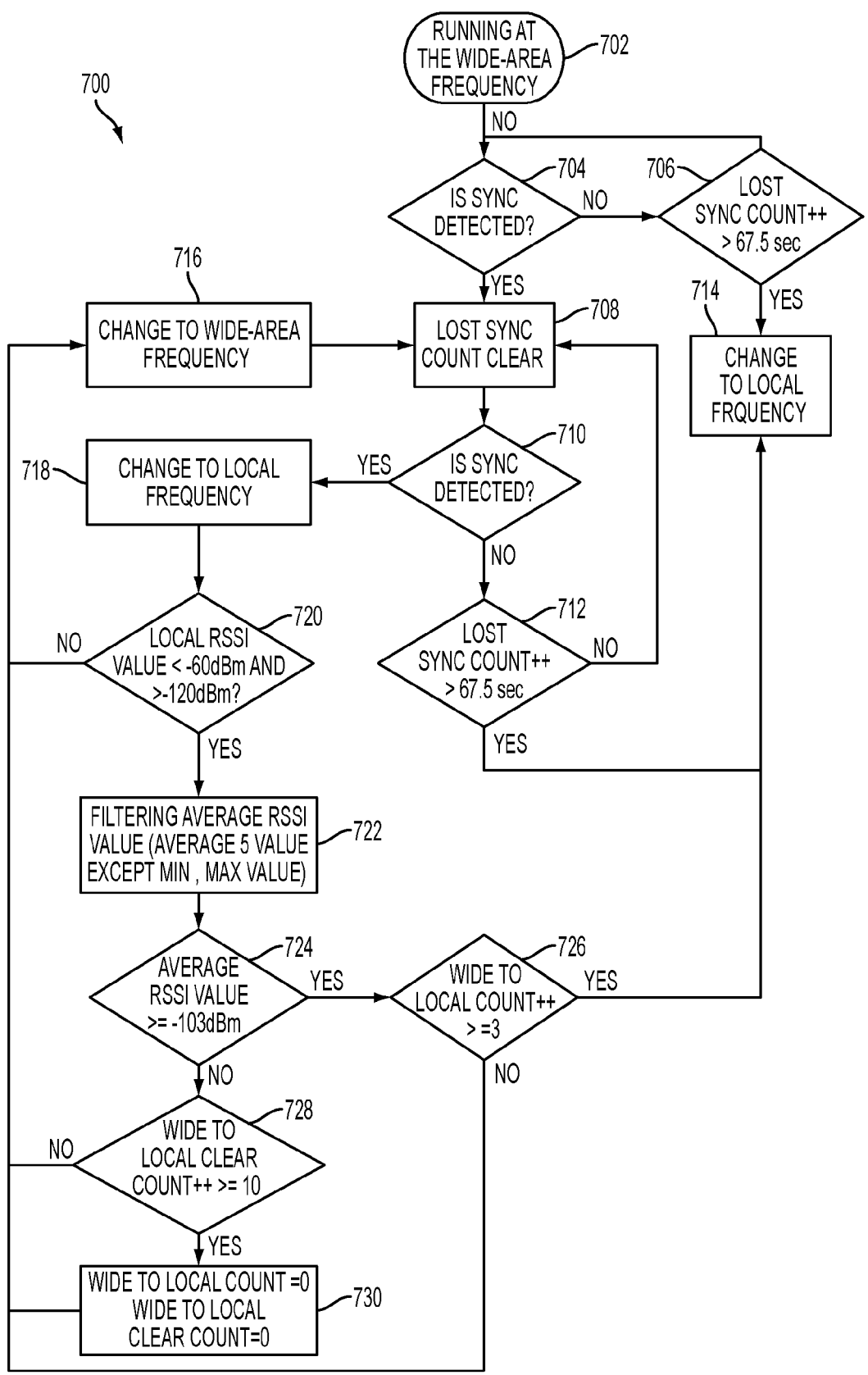
FIG. 7 depicts an example flow diagram for determining when a dual-frequency messaging device operating on a synchronous paging protocol is to change from a secondary frequency to a primary frequency.

FIG. 7 depicts an example flow diagram 700 for determining when a dual-frequency messaging device operating on a synchronous paging protocol is to change from the secondary frequency (shown as "wide-area frequency") to the primary frequency (shown as "local a frequency"). The flow diagram 700 can be executed by software residing in memory 126 (FIG. 1), for example.

At 702, a messaging device is operating a wide-area frequency. Such operation can be based on a change to the wide-area frequency initiated at 626 (FIG. 6). At 704, it is determined if synchronization can be established with the wide-area frequency. At 706, it is determined synchronization is established within a certain time period. In the illustrated embodiment, the time period is 67.5 seconds, although this disclosure is not so limited. If the wide-area frequency synchronization signal is not received within the time period, the messaging device is changed to operate at the local frequency at 714. The process flow can than resume at 602, as shown in FIG. 6. As is to be appreciated, while flow diagram 700 and flow diagram 600 refer to particular time periods, such time period can be a function of a variable incremented at certain intervals, such the variable named Lost Sync Count of FIG. 6 and FIG. 7. For example, a variable may be incremented every 1.875 seconds. After 26 increments, a time period of 48.75 seconds will have elapsed, after 36 increments, a time period of 67.5 seconds will have elapsed, and so forth. Therefore, the various time periods referred to herein can effectively be monitored by tracking the value of a variable that is incremented at known timed intervals.

If a synchronization signal on the wide-area frequency was detected at 704, the Lost Sync Count variable is reset at 708. If another synchronization signal on the wide-area frequency is not detected at 710, the process proceeds to 712, where the Lost Sync Count variable is incremented to indicate the passage of time. If 67.5 seconds (or other suitable time period) has elapsed without detected a synchronization signal, the messaging device changes to operate at the local frequency at 714. If another synchronization signal on the wide-area frequency is detected at 710, the process proceeds to 718, where the messaging device is switched to operate on the local (or primary) frequency. After switching to the local frequency, parameters associated with the local frequency levels can be analyzed to determine the appropriate course of action. At 720, the RSSI value of the local frequency is analyzed to determine if it falls within a particular range, which is shown as −60 dBm to −120 dBm although other embodiments can use different ranges. If the RSSI of the local frequency is not within the range, it is not a usable signal and the messaging device is changed back to operating on the wide-area frequency at 716. If the RSSI of the local frequency is within the range, the filtered average RSSI value can be determined at 722 once a requisite number of RSSI values have been determined.

At 724, the average RSSI value is analyzed to determine its relative strength. If the average RSSI value is greater than or equal to a threshold (shown as −103 dBm in the illustrated embodiment), a variable is incremented at 726 indicating a favorable local frequency signal strength is present. When the value of the variable meets or exceeds a threshold (shown as 3 in the illustrated embodiment), the messaging device can continue to operate at the local frequency, as indicated at 714. If the average RSSI value at 724 is not greater than or equal to a threshold (shown as −103 dBm in the illustrated embodiment), it may indicate a relatively weak local signal. A variable tracking this condition, shown as "Wide to Local Clear," can be incremented. At 728, the value of this variable is checked and if it is greater than or exceeds a threshold (which could indicate a relatively long period of weak local signal strength), various variables are reset to zero at 730. Example operational scenarios illustrating the hysteresis effect of the processing blocks 722, 724, 726, 728, and 730 is shown below in FIG. 12.

Figure 8A:
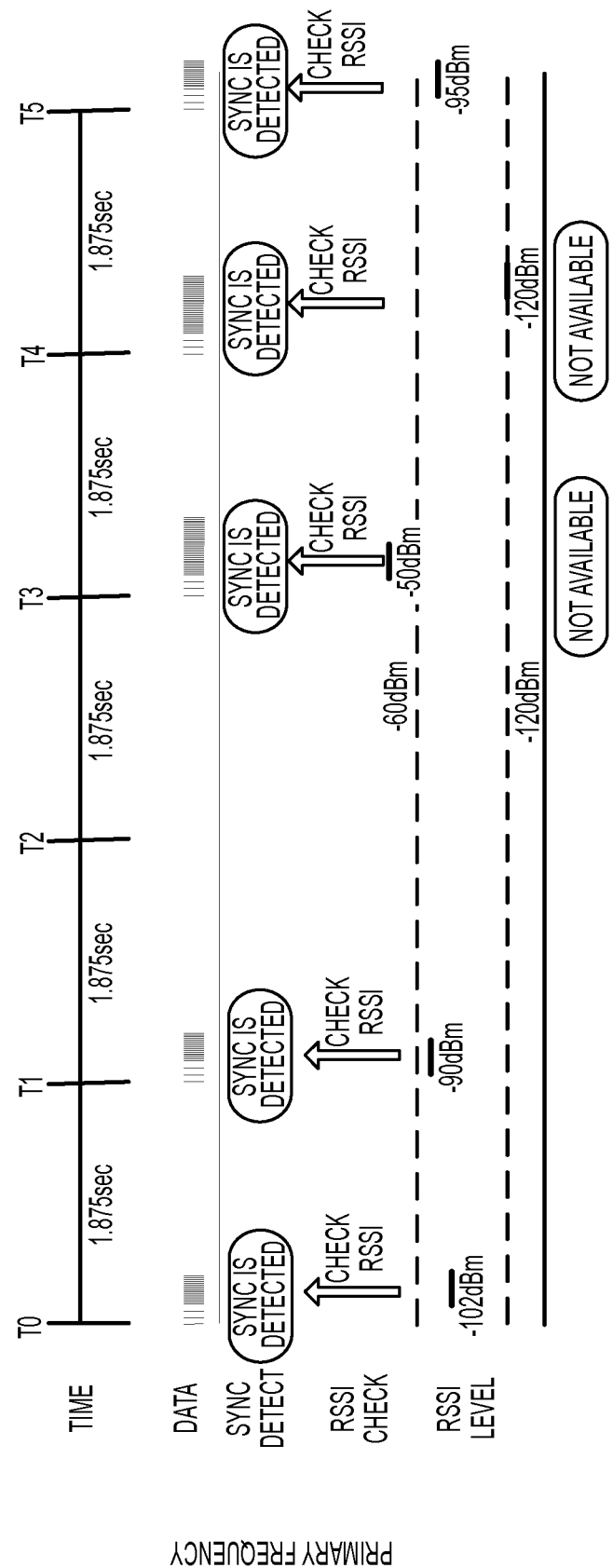
FIGS. 8A-8B depict example operational diagrams of a messaging device checking received signal strength indication (RSSI) levels.
Figure 8B:
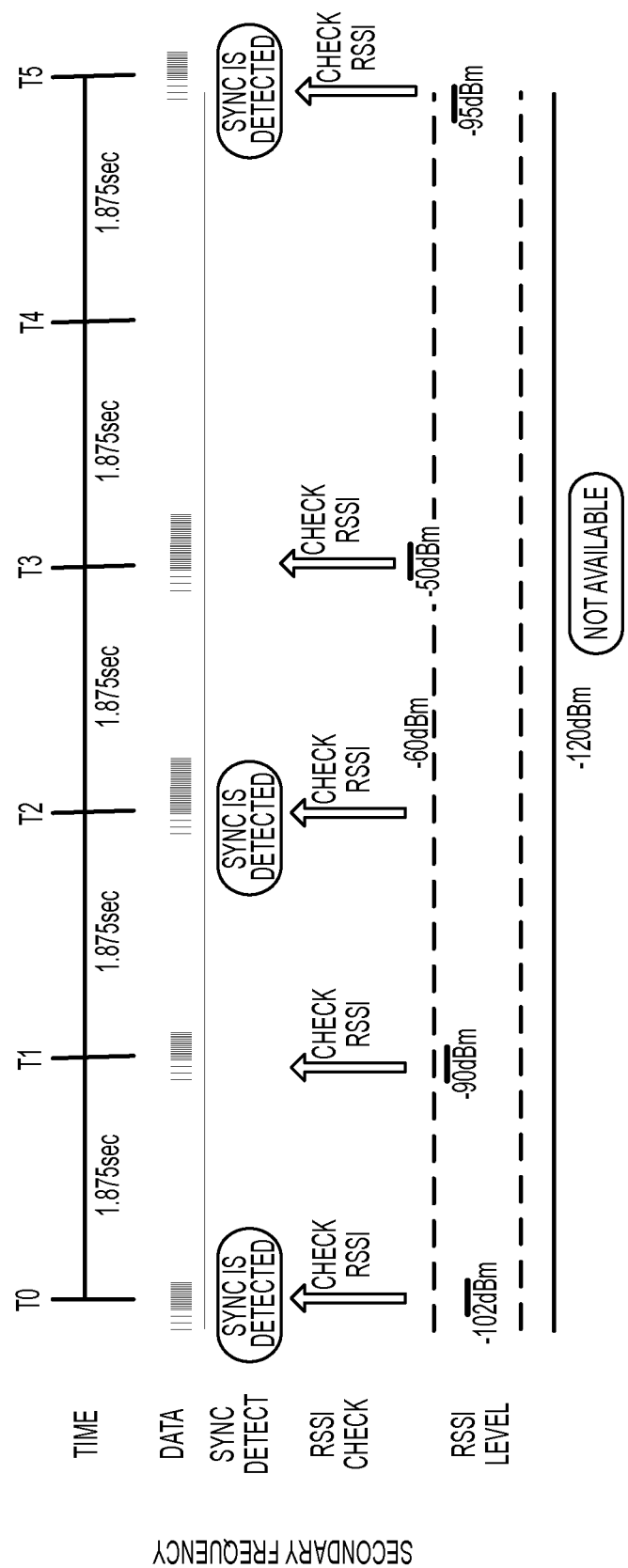

FIGS. 8A-8B depict example operational diagrams of a messaging device checking RSSI levels. The illustrated embodiments show actions taken at T0, T1 . . . T5, where each interval is separated by 1.875 seconds, which coordinates with length of the frames transmitted in the FLEX® data format. Other embodiments can use different timing intervals. Generally, the messaging device wakes-up every 1.875 seconds and if a synchronization signal is detected, the RSSI level is checked. FIG. 8A shows a messaging device operating on a primary frequency (e.g., a local frequency) and FIG. 8B shows a messaging device operating on a secondary frequency (e.g., a wide-area frequency). FIGS. 8A-8B depict a selected RSSI target range of −120 dBm to −60 dBm, which coordinates with the process blocks 612 and 720 in FIGS. 6 and 7, respectively. As is to be appreciated, different RSSI target ranges can be used. In any event, FIG. 8A depicts the messaging device checking the RSSI of the local frequency at T0, T1 and T5 upon detecting the synchronization signal. The RSSI level at T0, T1 and T5 are all shown to be within the RSSI operating range, which indicates the local frequency may be usable. By comparison, the RSSI levels at T3 and T4 are not within the RSSI operating range. Accordingly, the local frequency is deemed not available for those intervals, as indicated in FIG. 8A. With reference to FIG. 8B, the RSSI check that is performed can be a check of the local RSSI level. Accordingly, the RSSI levels measured at each time interval in FIG. 8A and FIG. 8B are shown to be the same.

FIG. 9 depicts time-based operational frequency changes of a messaging device in accordance with one non-limiting embodiment. Generally, when a messaging device is reset or powered on, the messaging device will try to receive a synchronization signal on its local frequency. In the illustrated embodiment, synchronization signals are not received any of the time periods (illustrated as 67.5 seconds). At T1, the messaging device changes its operational frequency from the local frequency to the wide-area frequency in an attempt to synchronize. After 67.5 seconds (or other suitable time frame), the messaging device changes its operational frequency from the wide-area frequency back to the local frequency. As shown, the process of switching operational frequencies can continue as the time periods for detecting synchronization signals expire.

Figure 10:
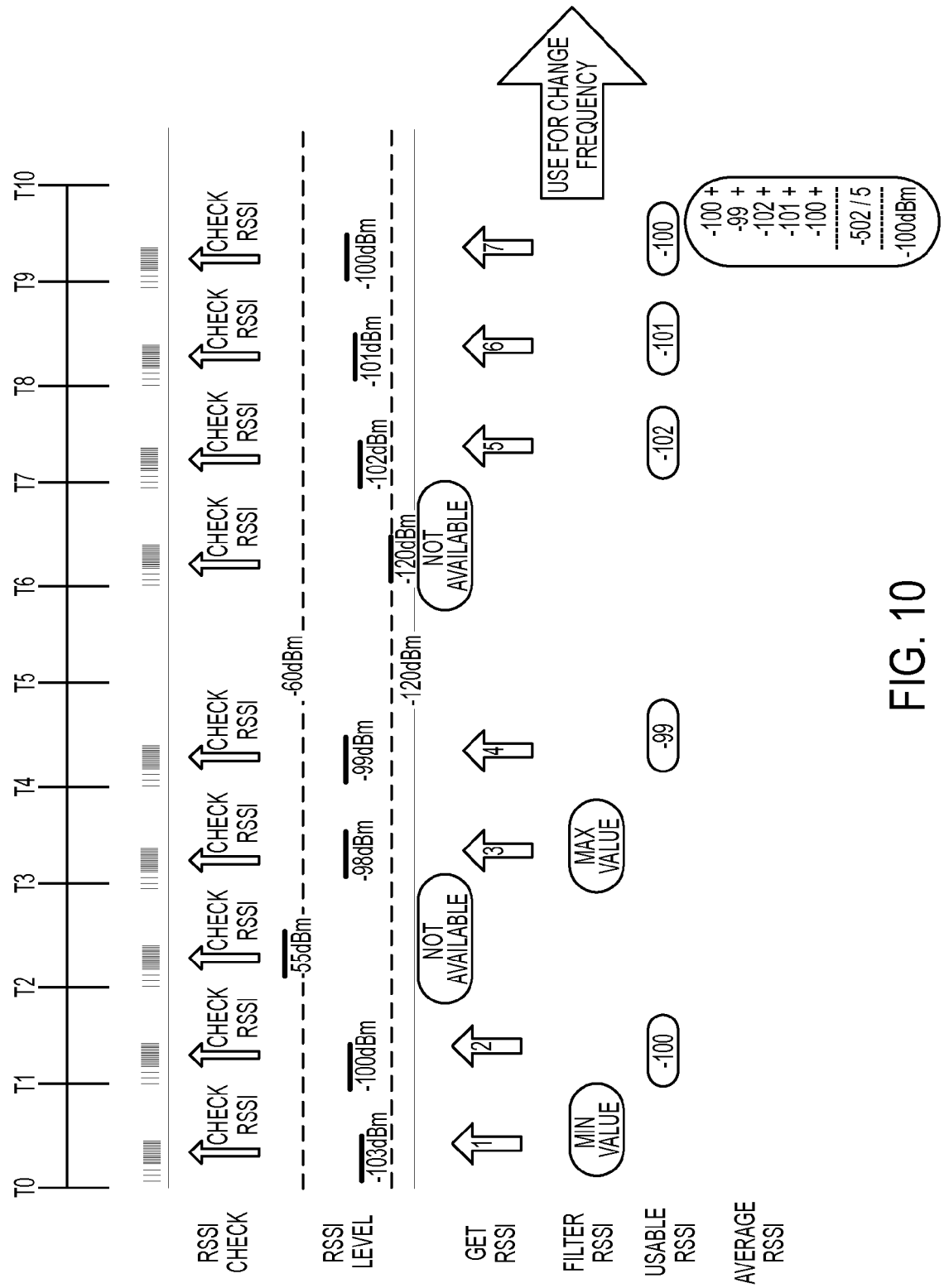
FIG. 10 depicts a messaging device determining a filtered average RSSI level in accordance with one non-limiting embodiment.

FIG. 10 depicts a messaging device determining a filtered average RSSI level in accordance with one non-limiting embodiment. As illustrated, the RSSI level is measured at time intervals T0, T1 . . . T9 based on the receipt of the synchronization signals. The RSSI levels at T2 and T6 are not within the RSSI target range (shown as −120 dBm to −60 dBm), and accordingly are not used in the calculation. In the illustrated embodiment, the messaging device seeks to obtain an average RSSI value within a suitable range before the operational frequency of the device is switched. The RSSI levels used in the calculation are also filtered to remove the minimum and maximum values from the calculation. Other techniques for filtering/averaging the RSSI levels can be used. As illustrated, the RSSI level measured at T0 is deemed the minimum value and the RSSI level measured at T3 is the maximum value. Accordingly, these RSSI levels are not used in the calculation. The RSSI levels at T1, T4, T7, T8 and T9 are averaged by adding them together and dividing by five to reach a filtered average RSSI value of −100 dBm. This filtered average RSSI value can be compared against a RSSI trigger threshold to determine if the operational frequency should be changed. As illustrated in FIG. 6 and FIG. 7, the level of the this RSSI trigger threshold may a first level when the messaging device is operating in the primary frequency and a different level when the messaging device is operating in the secondary frequency.

Figure 11:
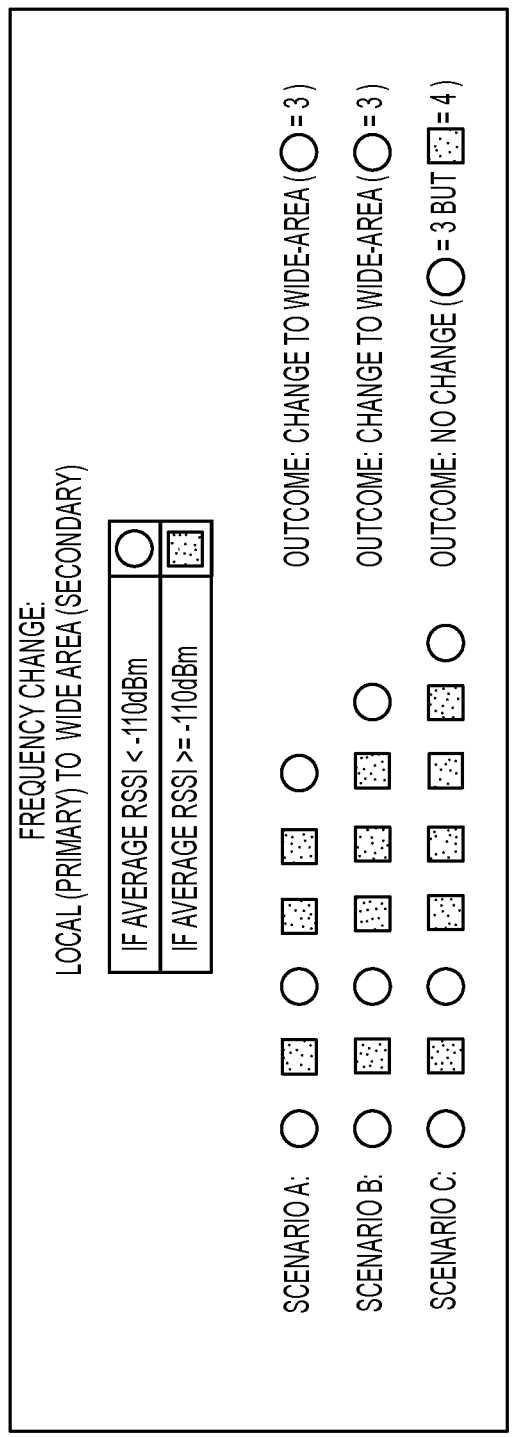
FIG. 11 depicts three example operational scenarios for a messaging device that is operating at a local (primary) frequency.
Figure 12:
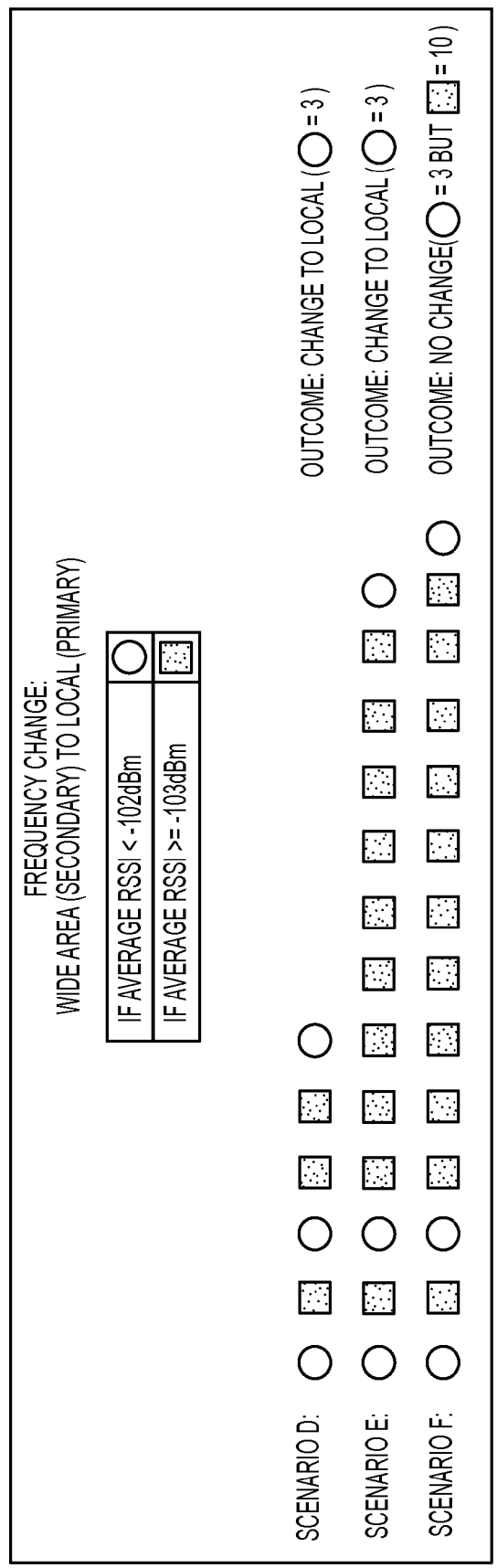
FIG. 12 depicts three example operational scenarios for a messaging device operating at a wide area (secondary) frequency.

FIGS. 11 and 12 depict frequency changes of a messaging device based upon various operational conditions in accordance with non-limiting embodiments. Hysteresis is utilized in an attempt to avoid frequent switching of operational frequency when the RSSI levels are near the threshold values. FIG. 11 depicts three example operational scenarios for a messaging device operating at the local frequency and generally coordinates with the processing blocks 616, 618, 620 and 624 of FIG. 6. Referring first to Scenarios A and B, the messaging device determines that the frequency should be changed to the wide-area frequency due to the occurrence of three average RSSI levels below the threshold (see processing block 624 in FIG. 6), which indicates the local frequency signal strength has a sufficient history of being too weak. With Scenario C, however, the operational frequency is not changed. As shown, the messaging device determines that there have been three instances of the average RSSI level being low, but since the messaging device determined there were four instances of relatively strong signals, the operational frequency of the device was not changed (see processing blocks 618 and 620 of FIG. 6). As is to be appreciated, while the threshold average RSSI level is set at −110 dBm in FIG. 11 and FIG. 6, any suitable threshold average RSSI level can be used without departing from the scope of this disclosure.

FIG. 12 depicts three example operational scenarios for a messaging device operating at the secondary frequency and generally coordinates with the processing blocks 722, 724, 726, 728 and 730 of FIG. 7. Referring first to Scenarios D and E, the messaging device determines that the frequency should be changed to the local frequency due to the occurrence of three average RSSI levels below the threshold (see processing block 726 in FIG. 7). With Scenario F, however, the operational frequency is not changed. As shown, the messaging device determines that there have been three instances of the average RSSI level being low, but since the messaging device determined there were ten instances of relatively strong signals, the operational frequency of the device was not changed (see processing blocks 728 and 730 of FIG. 7). As is to be appreciated, while the threshold average RSSI level is set at −102 dBm in FIG. 12 and FIG. 7, any suitable threshold average RSSI level can be used without departing from the scope of this disclosure.

Figure 13:
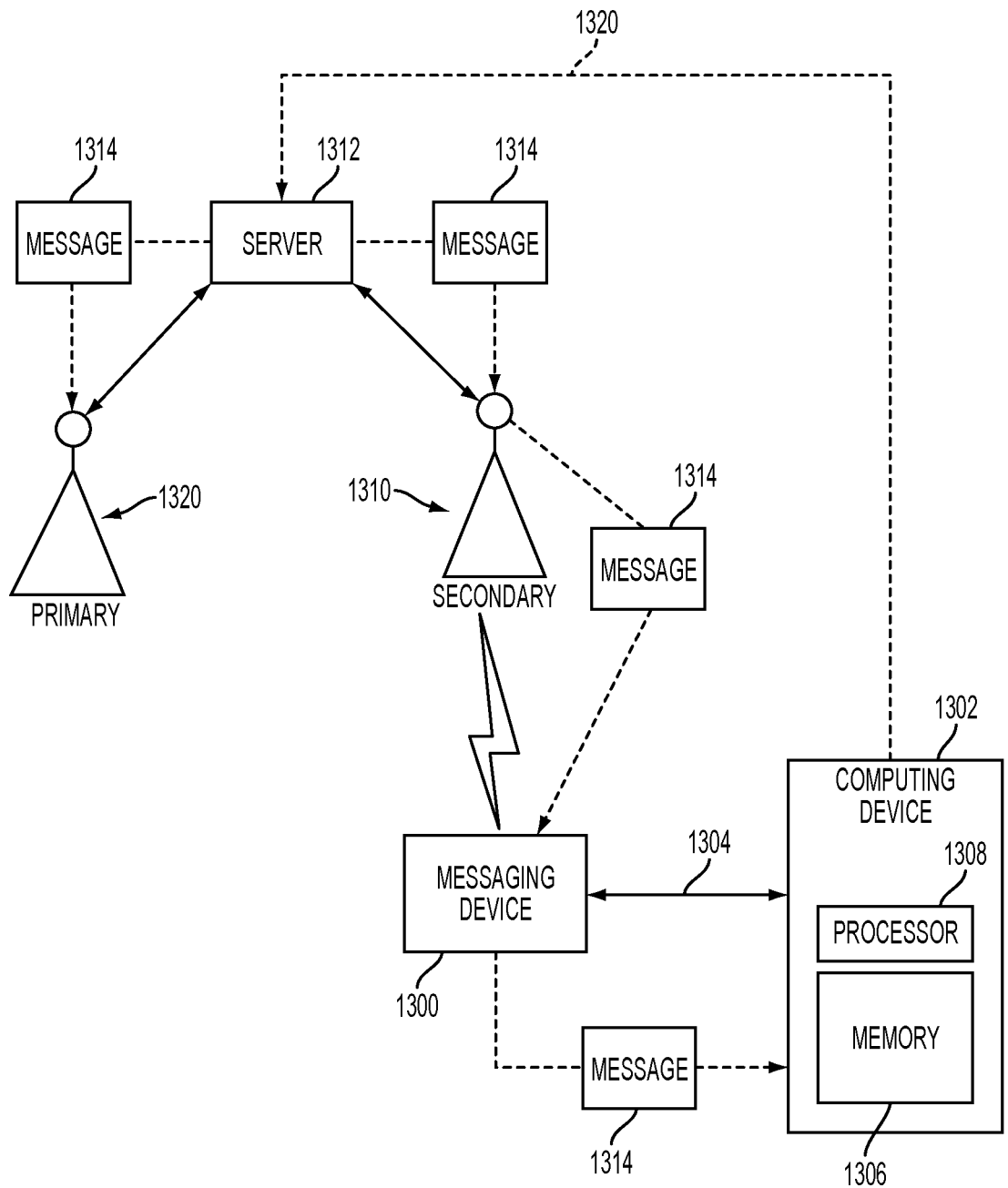
FIG. 13 depicts a system block diagram of a messaging device in wireless communication with a computing device.

FIG. 13 depicts a system block diagram of a messaging device 1300 in wireless communication with a computing device 1302. The computing device 1302 can be, for example, a smart phone, a tablet computer, personal computer, laptop computer, or other device with messaging functionality. The computing device 1302 can, for example, support wireless wide area network (WWAN) data communications services including Internet access. Examples of WWAN data communications services can include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. The computing device 1302 can provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others. In some example embodiments, the computing device 1302 also can be arranged to perform data communications functionality in accordance with shorter range wireless networks, such as a wireless personal area network (PAN) offering Bluetooth® data communications services in accordance with the Bluetooth® Special Interest Group (SIG) series of protocols, specifications, profiles, and so forth. Other examples of shorter range wireless networks can employ infrared (IR) techniques or near-field communication techniques and protocols, such as electromagnetic induction (EMI) techniques including passive or active radio-frequency identification (RFID) protocols and devices.

The computing device 1302 can comprise various radio elements, including a radio processor, one or more transceivers, amplifiers, filters, switches, and so forth to provide voice and/or data communication functionality. It can be appreciated that the computing device 1302 can operate in accordance with different types of wireless network systems utilize different radio elements to implement different communication techniques. The computing device 1302 also can comprise various input/output (I/O) interfaces for supporting different types of connections such as a serial connection port, an IR port, a Bluetooth® interface, a network interface, a Wi-Fi interface, a WiMax interface, a cellular network interface, a wireless network interface card (WNIC), a transceiver, and so forth. The computing device 1302 can comprise one or more internal and/or external antennas to support operation in multiple frequency bands or sub-bands such as the 2.4 GHz range of the ISM frequency band for Wi-Fi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/JMTS communications, the 1575 MHz frequency band for Global Positioning System (GPS) operations, and others.

The computing device 1302 can provide a variety of applications for allowing a user to accomplish one or more specific tasks using the embeddedness system 100. Applications can include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), contacts application, calendar application and so forth. The computing device 1302 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a PALM OS, MICROSOFT OS, APPLE OS, UNIX OS, LINUX OS, SYMBIAN OS, EMBEDIX OS, Binary Run-time Environment for Wireless (BREW) OS, JavaOS, a Wireless Application Protocol (WAP) OS, and others.

A wireless communication link 1304 between the messaging device 1300 and the computing device 1302 can be any suitable data transmission link, such as, a Bluetooth® link, a Wi-Fi link, NFC link, and so forth. The messaging device 1300 can be configured to attempt to establish the wireless communication link 1304 whenever it is in proximity to the computing device 1302. Once a link has been established, the messaging device 1300 can be configured to transfer messages that are received by the messaging device 1300 to the computing device 1302 via the wireless communication link 1304. The computing device 1302 can include software instructions stored within a memory 1306, which when executed by the processor 1308, which would allow an end user to view the message 1314 on the computing device 1302. In some embodiments, the computing device 1302 can also transmit replies, such as message statuses.

A return channel 1320 can allow for communication between the computing device 1302 and the server 1312. As is to be appreciated, the return channel 1320 can be routed through any suitable communications networks. The return channel 1320 can be used by the computing device 1302 to provide messaging to the server 1312. The messaging could include any suitable data, such as the status of the message 1314. Thus, the computing device 1302 can indicate the message was received, read, deleted, and so forth. In some embodiments, the messaging device 1300 is a one-way device yet two-way communication achieved by way of the return channel 1320 between the computing device 1302 and the server 1312.

In some embodiments, the computing device 1302 is configured to alert the user of the message 1314 that is received on the messaging device 1300. The alert on the computing device 1302 could be an audible alert, a visual alert, or various combinations thereof. With the computer device 1302 synced to the server 1312, the computing device 1302 can also provide confirmation to the server 1312 indicating the receipt of the message 1314.

The messaging device 1300 can be in communication with a secondary station transmitter 1310, which operates at a wide-area frequency. In the illustrated example, the messaging device 1330 is not in communication with the primary station transmitter 1320 which operates a local frequency. Both the secondary station transmitter 1310 and the primary station transmitter 1320 are in communication with a message server 1312. The station transmitter 1310 can cause the transmission of a message 1314, which may be a "one-to-many" message or a "one-to-one" message from both transmitters 1310 and 1320. The messaging device 1300 will receive the messages 1314 from the secondary station transmitter 1310.

Figure 14:
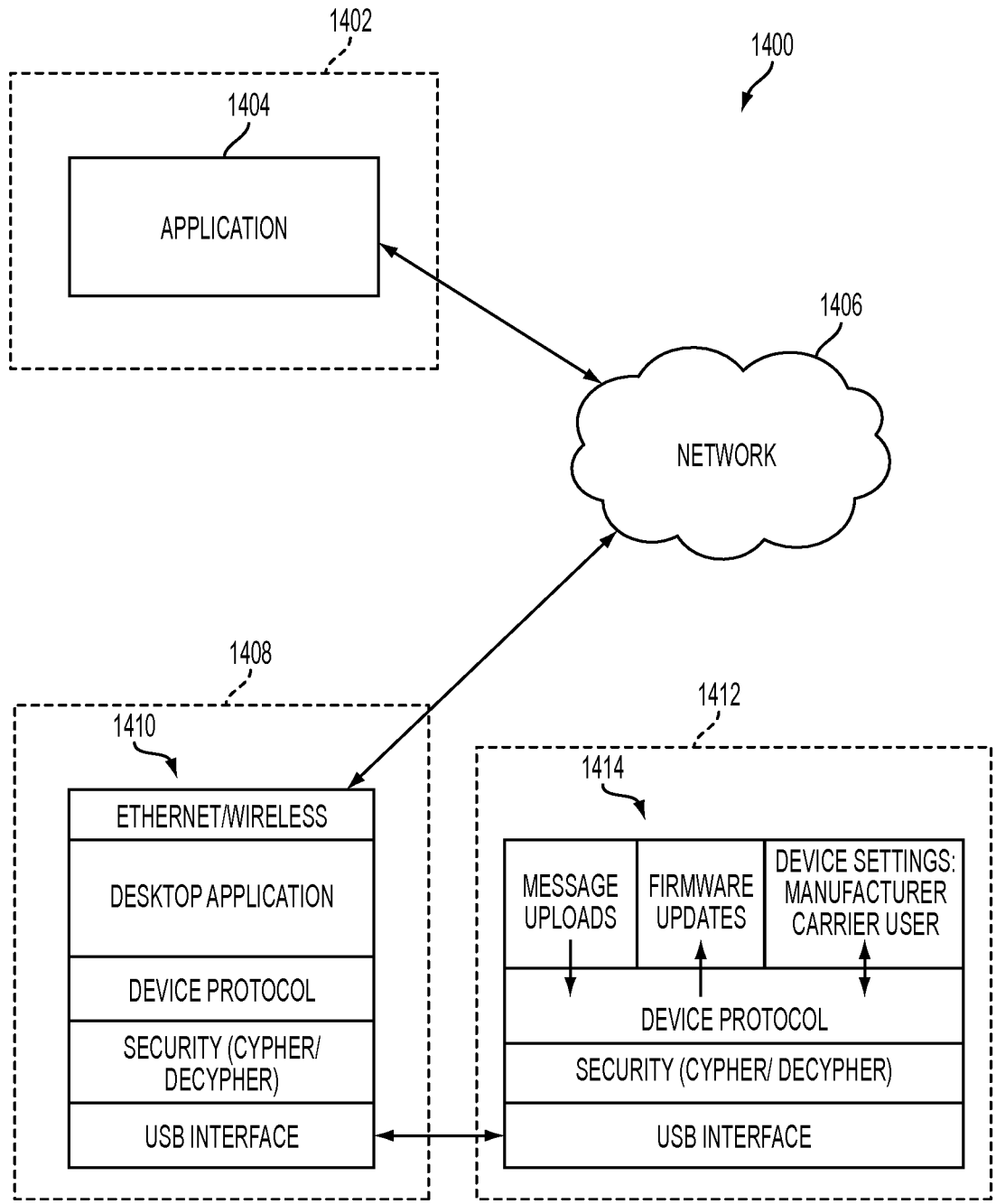
FIG. 14 depicts an example block diagram of a server in communication with a computing device and a messaging device.

FIG. 14 depicts an example block diagram 1400 of a server 1402 in communication with a computing device 1408 and a messaging device 1412 via a network 1406. Such configuration can be used, for example, to implement OTIP, as described above. The server 1402 can execute an application 1404 which is stored in memory and is generally associated with messaging device account management. An exemplary protocol stack 1410 is illustrated for the computing device 1408 and an exemplary protocol stack 1414 is illustrated for the messaging device 1412. In the illustrated embodiment, the computing device 1408 is electrically coupled to the messaging device 1412 via a USB interface. Other types of interfaces can be used, such as wireless interfaces, for example. The computing device 1408 can be any suitable device capable of communicating with the messaging device 1412 and having a network connection to communicate with the network 1406. Example computing devices 1408 can include, without limitation, a personal computer, tablet computer, smart phone, laptop computer, and so forth.

When the messaging device 1412 is plugged in to the USB port of the computer device 1408 (or otherwise coupled thereto), the messaging device 1412 can connect to a desktop application, as shown in the protocol stack 1410. In some embodiments, the desktop application will prompt for device serial number and password, or other types of login credentials. The person logging in to the desktop application may only be allowed to do certain functions based on a level of user rights. After the password is verified by accessing the messaging device 1412, the desktop application can use the serial number and the password, for example, to connect to the application 1402 at the server 1402 through the network 1406. If a connection is not available, or cannot otherwise be established, then access to the messaging device 1412 may be denied. In some embodiments, however, if a high level of access accompanies a user's login credentials, then a connection to the application 1402 at the server 1402 is not necessarily required.

Various functionality can be implemented between the computing device 1408 and the messaging device 1412 via the electrical coupling 1418. For example, using the desktop application executed on the computing device 1408, the computing device 1408 can send various commands to the messaging device 1412 device, such as to set a parameter or to request information. The messaging device 1412 can send commands to the desktop application, such as "receive message list" or "check for new firmware". Moreover, in some embodiments, the desktop application can perform a firmware update process. It is noted that the desktop application executed on the computing device 1408 can provide security for all data received from the messaging device 1412, including anything that is temporally stored. The desktop application can also securely communicate with the server 1402.

Communications between the computing device 1408 and the server 1402 can include, for example, setting/configuration updates for the messaging device 1412. The desktop application can also submit requests to the server 1402 such as "get latest firmware version," "download latest firmware version," and so forth. Communications between the computing device 1408 and the server 1402 can also include the uploading of received messages lists and/or messaging device configurations.

The application 1404 executed by the server 1402 can provide various functionality. In some embodiments, the application 1404 can send commands to the messaging device 1412 (through the computing device 1408) to update its settings, configurations, and/or operational parameters. The application 1404 can also send the latest version of firmware to the desktop application. The application 1404 can also store one or more sets of complete configurations/parameters for a messaging device. Moreover, the application 1404 can receive and store updates to configurations of the messaging device 1412, as received from the desktop application. The application 1404 can also respond to the requests, commands, and other types of messaging received from the desktop application (e.g., to send the latest firmware version).

The examples presented herein are intended to illustrate potential and specific implementations of the present disclosure. It can be appreciated that the examples are intended primarily for purposes of illustration of the disclosure for those skilled in the art. No particular aspect or aspects of the examples are necessarily intended to limit the scope of the present disclosure. For example, no particular aspect or aspects of the examples of system architectures, user interface layouts, or screen displays described herein are necessarily intended to limit the scope of the disclosure.

It is to be understood that the figures and descriptions of the present disclosure have been simplified to illustrate elements that are relevant for a clear understanding of the present disclosure, while eliminating, for purposes of clarity, other elements. Those of ordinary skill in the art will recognize, however, that these sorts of focused discussions would not facilitate a better understanding of the present disclosure, and therefore, a more detailed description of such elements is not provided herein.

Any element expressed herein as a means for performing a specified function is intended to encompass any way of performing that function including, for example, a combination of elements that performs that function. Furthermore the disclosure, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the disclosure. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the disclosure.

Moreover, the processes associated with the present embodiments may be executed by programmable equipment, such as the messaging devices described herein. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a non-transitory computer-readable memory medium or media that direct a computer or computer system to perform process steps. Non-transitory computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

While various embodiments of the disclosure have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

We claim:

1. An electronic messaging device, comprising:
a receiver configured to receive a message at an operational frequency;
a controller operatively connected to the receiver;
a memory operatively connected to the controller and configured to store a message received by the receiver, a value of a first variable, and a value of a second variable; and
a power source configured to supply electrical power to the controller; and
wherein the controller is configured to:
operate the receiver at a first operational frequency;
determine a first filtered average received signal strength indication (RSSI) level of the first operational frequency, wherein the first filtered average RSSI level is based on a first plurality of measured RSSI levels;
increment the value of the first variable and reduce the value of the second variable when the value of the first variable is at a first threshold value when the determined first filtered average RSSI level of the first operational frequency is above a first threshold RSSI level; and
operate the receiver at a second operational frequency when the value of the second variable is at a second threshold value.

2. The electronic messaging device of claim 1, wherein only measured RSSI levels that are within a target RSSI range are included in the first plurality of measured RSSI levels.

3. The electronic messaging device of claim 1, wherein the first threshold RSSI level is about −110 dBm.

4. The electronic messaging device of claim 3, wherein the target RSSI range is about −120 dBm to about −60 dBm.

5. The electronic messaging device of claim 1, wherein the first threshold value is equal to the second threshold value.

6. The electronic messaging device of claim 5, wherein the first threshold value is three and the second threshold value is three.

7. The electronic messaging device of claim 1, wherein when the value of the first variable meets or exceeds the first threshold value, the value of the second variable is reduced to a value of zero.

8. The electronic messaging device of claim 1, wherein the controller is further configured to:
when the receiver is operating at the second operational frequency, operate the receiver at the first operational frequency when a synchronization signal is received;
determine a second filtered average RSSI level of the first operational frequency based on a second plurality of measured RSSI levels, wherein only measured RSSI levels that are within the target RSSI range are included in the second plurality of measured RSSI levels; and
when the second determined filtered average RSSI level of the first operational frequency is below a second threshold RSSI level, operate the receiver at the second operational frequency.

9. The electronic messaging device of claim 8, wherein the second determined threshold RSSI level is greater than the first threshold RSSI level.

10. The electronic messaging device of claim 8 wherein the controller is configured to: monitor a number of times that the second determined filtered average RSSI level of the first operational frequency is above the second threshold RSSI level; and
continue to operate the receiver at the first operational frequency when the number of times that the second determined filtered average RSSI level of the first operational frequency meets a third threshold.

11. The electronic messaging device of claim 10, wherein the controller is configured to: monitor a number of times that the second determined filtered average RSSI level of the first operational frequency is below the second threshold RSSI level; and
when the number of times that the second determined filtered average RSSI level of the first operational frequency is below the second threshold RSSI level and meets a fourth threshold number of times, reduce a count associated with the number of times that
the second determined filtered average RSSI level of the first operational frequency is above the second threshold RSSI level.

12. The electronic messaging device of claim 11, wherein the second threshold RSSI level is about −103 dBm.

13. The electronic messaging device of claim 11, wherein the third threshold number of times is three times and the fourth threshold number of times is ten times.

14. The electronic messaging device of claim 1, wherein the power source is a rechargeable power source.

15. The electronic messaging device of claim 14, comprising a data port, wherein the rechargeable power source is configured to receive a charge via the data port.

16. The electronic messaging device of claim 15, wherein the data port is a Universal Serial Bus (USB) interface.

17. The electronic messaging device of claim 1, wherein the controller is configured to decrypt messages received by the receiver using an encryption key.

* * * * *